United States Patent [19]

Sugiura

[11] 4,144,463
[45] Mar. 13, 1979

[54] STABILIZED DC POWER SUPPLY DEVICES FOR PROVIDING A PLURALITY OF DC POWER OUTPUTS WHICH ARE SELECTIVELY CONSUMED

[75] Inventor: Naokatsu Sugiura, Tokyo, Japan

[73] Assignee: Sansui Electric Co., Ltd., Tokyo, Japan

[21] Appl. No.: 797,785

[22] Filed: May 17, 1977

[30] Foreign Application Priority Data

May 20, 1976 [JP] Japan .................................. 51-58260
May 20, 1976 [JP] Japan .............................. 51-64409[U]

[51] Int. Cl.² .............................................. H02J 1/00
[52] U.S. Cl. ...................................... 307/75; 307/24; 307/25; 307/28; 307/52; 307/33; 307/60
[58] Field of Search ...................... 307/24, 25, 28, 33, 307/43 PS, 52, 60, 72, 75

[56] References Cited

U.S. PATENT DOCUMENTS 3,083,321   3/1963   Howe ..................................... 307/75

Primary Examiner—Robert K. Schaefer
Assistant Examiner—Eugene S. Indyk
Attorney, Agent, or Firm—Harris, Kern, Wallen & Tinsley

[57] ABSTRACT

A stabilized DC power outputs supply devices for providing a plurality of DC power outputs which are selectively consumed, is provided by use of a single power control circuit. A plurality of DC power outputs are taken out from the single power control circuit through rectifier circuits and low-pass filter circuits. A voltage of each of the DC power outputs is sensed by a corresponding voltage sensing circuit and is compared with a corresponding reference voltage at a corresponding voltage comparing circuit. Detecting circuits for detecting one of the DC power outputs which is being consumed are provided to apply to a control signal generator the output of one of the comparing circuits which is corresponding to the DC power output detected by the detecting circuits. The control signal generator provides a control signal to the single power control circuit to stabilize the voltage of the DC output which is being consumed.

15 Claims, 10 Drawing Figures

FIG. 3.
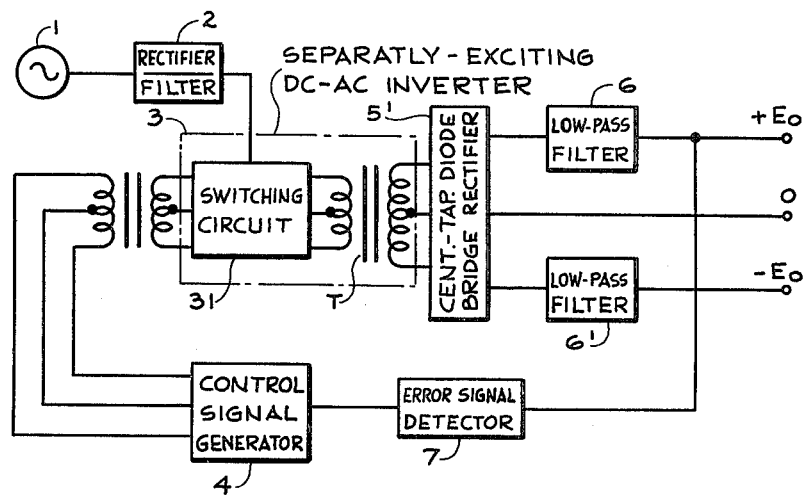
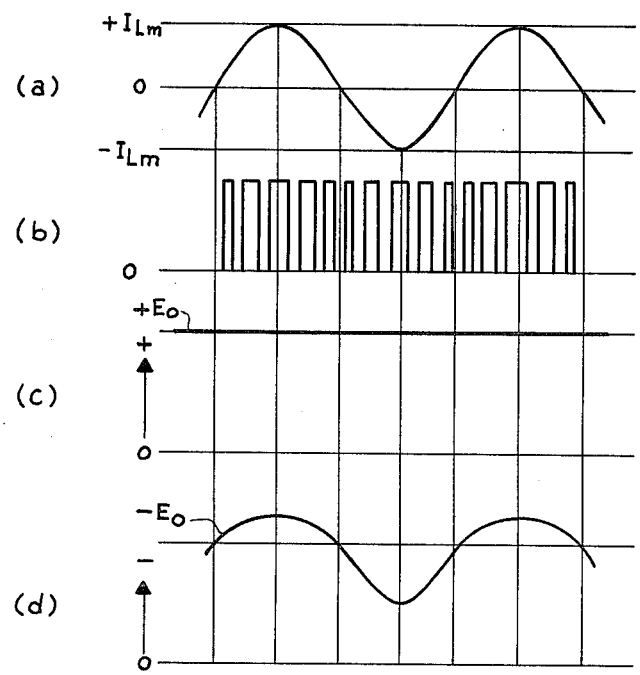
FIG. 4.

STABILIZED DC POWER SUPPLY DEVICES FOR PROVIDING A PLURALITY OF DC POWER OUTPUTS WHICH ARE SELECTIVELY CONSUMED

BACKGROUND OF THE INVENTION

This invention relates to stabilized DC power supply devices and, in particular, such devices for providing a plurality of DC power outputs which are selectively consumed.

As a system for regulating a voltage level of a DC power output, a switching type regulating system has been known wherein a switching element is provided with between a DC power source and a DC power output. The on-off operation of the switching element is controlled in response to the variation of the DC output voltage level. In this system the electric power is controlled by the switching element to stabilize the DC output voltage level. This system is known as a system that a power loss is little.

In case a plurality of stabilized DC powers are required, a plurality of switching type regulating systems are provided. But, if a plurality of stabilized DC powers are selectively used or consumed, it is not economical to use a plurality of switching type regulating systems.

Positive and negative DC powers are required for an audio-signal power amplifier of a complementary output type and they are selectively consumed at the amplifier. When one of the DC powers is consumed, the other is not loaded. It is not economical and makes the power supply device larger and weighter to provide a voltage regulating system to a non-loaded power.

SUMMARY OF THE INVENTION

A primary object of this invention is to provide a stabilized DC power supply device for providing a plurality of DC power outputs which are selectively consumed, wherein only one voltage regulating system is commonly so provided for the plurality of DC power outputs that one output which is now being consumed is stabilized by the system.

Another object of this invention is to realize above object with a simple and economical construction and a high efficiency.

A special object of this invention is to provide an economical and high efficient stabilized DC power supply device for an audio-signal power amplifier.

According to this invention, a stabilized DC power supply device for providing a plurality of DC power outputs which are selectively consumed, are provided which comprises a single power control means. The single power control means provides high frequency AC outputs from a DC power source. The DC power outputs are obtained by rectifying the high frequency AC outputs. The single power control means controls the electric power of the AC outputs in response to a control signal from a control signal generator. Voltage levels of the DC power outputs are sensed by corresponding voltage sensing means and are compared with the corresponding reference voltages at corresponding comparing circuit means, so that variations of voltage levels of the DC power outputs are detected. Means for detecting one of the DC power outputs which is now being consumed are provided to select an output from a comparing circuit means corresponding to the DC power output which is now being consumed. The selected output is applied to the control signal generator which provides, in turn, a control signal to the power control means to regulate the voltage level of the DC output which is now being consumed.

The power control means comprises switching circuit means including switching elements, on-off operation of which is controlled by the control signal, and a transformer having secondary windings from which AC outputs are taken out. The power control means is of a separately-exciting DC-AC inverter circuit having a plurality of AC outputs.

The control signal generator is of a pulse generator, such as a type that the pulse width is varied, or another type that the pulse repetition frequency is varied, by the output of the comparing circuit means.

Each of the comparing circuit means may be of a voltage comparing amplifier.

The means for detecting one of the DC power outputs which is now being consumed may be of diodes each of which is coupled to the output of each comparing circuit means at its one electrode and commonly connected to one another at the other electrode. The output voltage level of a comparing circuit means corresponding to one of DC power outputs which is now being consumed, presents at the common connection point of the diodes.

Further objects and features of this invention will be understood from following descriptions in connection with preferred embodiments of this invention referring to the annexed drawings.

BRIEF DESCRIPTION OF THE DRAWINGS

FIG. 3 shows a block diagram of a still another stabilized DC power supply device, FIG. 4 shows electric current and voltage waveforms at various points of the device in FIG. 3.

DETAILED DESCRIPTIONS OF PREFERRED EMBODIMENTS

Figure 1:
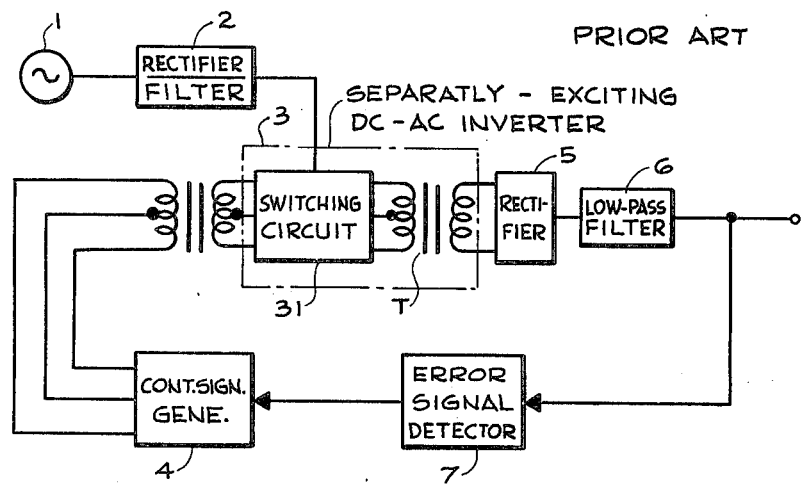
FIG. 1 shows a block diagram of a known stabilized DC power supply device.

FIG. 1 shows a known stabilized DC power supply device wherein a DC power source obtained from an AC power source 1 through a rectifier and filter circuit 2 is converted into AC power such as a high frequency square-wave AC power at a DC-AC inverter 3. The DC-AC inverter is of a separately-exciting type that the AC output power is controlled by a control signal or an exciting signal from a control signal generator 4. The DC-AC inverter 3 comprises a switching circuit 31 including switching elements and a transformer T coupled to the switching circuit. The on-off operation of the switching elements is controlled by the control signal. The control signal is pulse train. The variation of the pulse width or pulse repetition frequency changes the power of the AC output of the inverter. The AC output of the inverter is rectified by a rectifier 5 to provide a DC output through a low-pass filter 6 for smoothing the rectified output and removing a ripple present on the DC output. The variation of the voltage level of the DC output is detected by an error signal detector 7, and the error signal is applied to the control signal generator 4 to change, for example, the pulse width of the control signal. Thus the DC output is voltage regulated.

If a plurality of stabilized DC powers are required, plural sets of inverter, rectifier, low-pass filter, control signal generator and error signal detector must be provided.

But, in case a plurality of DC powers are selectively consumed or loaded, for example, in case of a DC power supply device for an audio-signal power amplifier of a complementary output type wherein positive and negative DC powers are selectively consumed, it is not economical to provide with a plurality of inverters and control signal generators.

Figure 2:
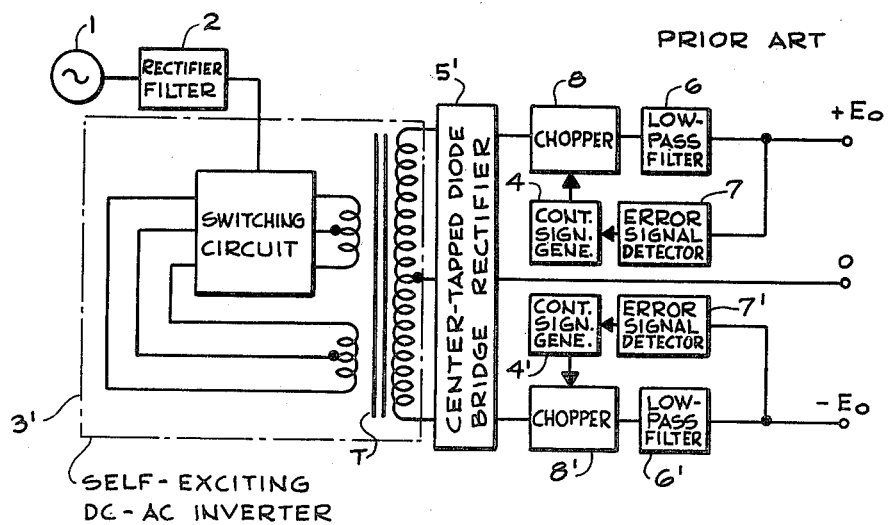
FIG. 2 shows a block diagram of another known stabilized DC power supply device.

A known stabilized DC power supply device for providing a plurality of regulated DC power outputs is shown in FIG. 2, wherein two AC power outputs are taken out from secondary windings of a transformer T of a self-exciting DC-AC inverter 3' and are rectified by a rectifier 5' to provide a positive and a negative DC power outputs $+E_0$ and $-E_0$ through low-pass filters 6 and 6'. The rectifier 5' is of a center-tapped diode bridge type to provide a positive and a negative DC currents from two opposite phase AC currents. Each DC output voltage level is detected at each of error signal detectors 7 and 7' which compares the detected voltage with the reference voltage. Each output of each error signal detector is applied to each of control signal generators 4 and 4' to provide control signals. Each control signal is applied to each of choppers 8 and 8' which are provided between the rectifier 5' and low-pass filters 6 and 6'. Thus, the DC outputs $+E_0$ and $-E_0$ are regulated.

In the device as shown in FIG. 2, two DC power outputs are obtained with regulated voltages by only one DC-AC inverter. But two chopper circuits must be provided to two DC outputs, respectively, to control the respective output powers to regulate output voltage levels. Therefore, for such a DC power supply device for providing a plurality of DC powers which are selectively consumed, this system is also uneconomical.

In view of above prior arts, the inventor experimentally tried a construction as shown in FIG. 3, wherein a plurality of, or two, AC outputs are taken out from secondary windings of the transformer of the separately-exciting DC-AC inverter 3, and are rectified by a center-tapped diode bridge rectifier 5' to provide two DC outputs $+E_0$ and $-E_0$ through low-pass filters 6 and 6'. The voltage of only one of the DC outputs is detected by an error signal detector to regulate voltage levels of the both DC outputs. The error signal is applied to the control signal generator 4 to provide a control signal to the separately-exciting DC-AC inverter 3, similarly as in FIG. 1.

In the system as shown in FIG. 3, since the voltage regulation is achieved by the use of the voltage variation of only one DC output, voltages of the other DC outputs cannot be regulated but is varied.

Referring to FIG. 4 which shows current and voltage waveforms at various points in the device as shown in FIG. 3, when the device is used for an audio-signal power amplifier of a complementary output type, the load current is assumed as shown at (a) in FIG. 4. The power is supplied from the positive output during each positive period of the load current and, on the other hand, from the negative output during each negative period of the current.

When a load current flows, the voltage level of the DC output drops down due to the resistance at the secondary winding, the rectifier circuit and the low-pass filter. But, the variation of the voltage level of the positive DC output $+E_0$ is detected by the error signal detector 7 and a control signal, which is shown as a pulse width modulated pulse train at (b) in FIG. 4, is provided to the inverter 3 from the control signal generator 4. Thus the voltage level of the positive DC output is maintained constant, as shown at (c) in FIG. 4. On the other hand, the voltage level of the negative DC output $-E_0$ is increased in a negative direction during each positive period of the load current because the inverter output power is increased by the control signal due to the variation of the positive DC output, and is decreased during each negative period of the load current because of the potential drop at the secondary windings, the rectifier circuit and the low-pass filter, and because the inverter output power is maintained lower by the control of the control signal due to the fact that the positive DC output does not supply any load current except the idling current of the amplifier. The variation of the voltage level of the negative DC power output $-E_0$ is shown at (d) in FIG. 4. Therefore, the stabilized DC powers cannot be obtained by the system as shown in FIG. 3.

Accordingly, an object of this invention is to provide a stabilized DC power supply device for providing a plurality of DC powers which are selectively consumed and with an economical construction and a high efficiency.

Figure 5:
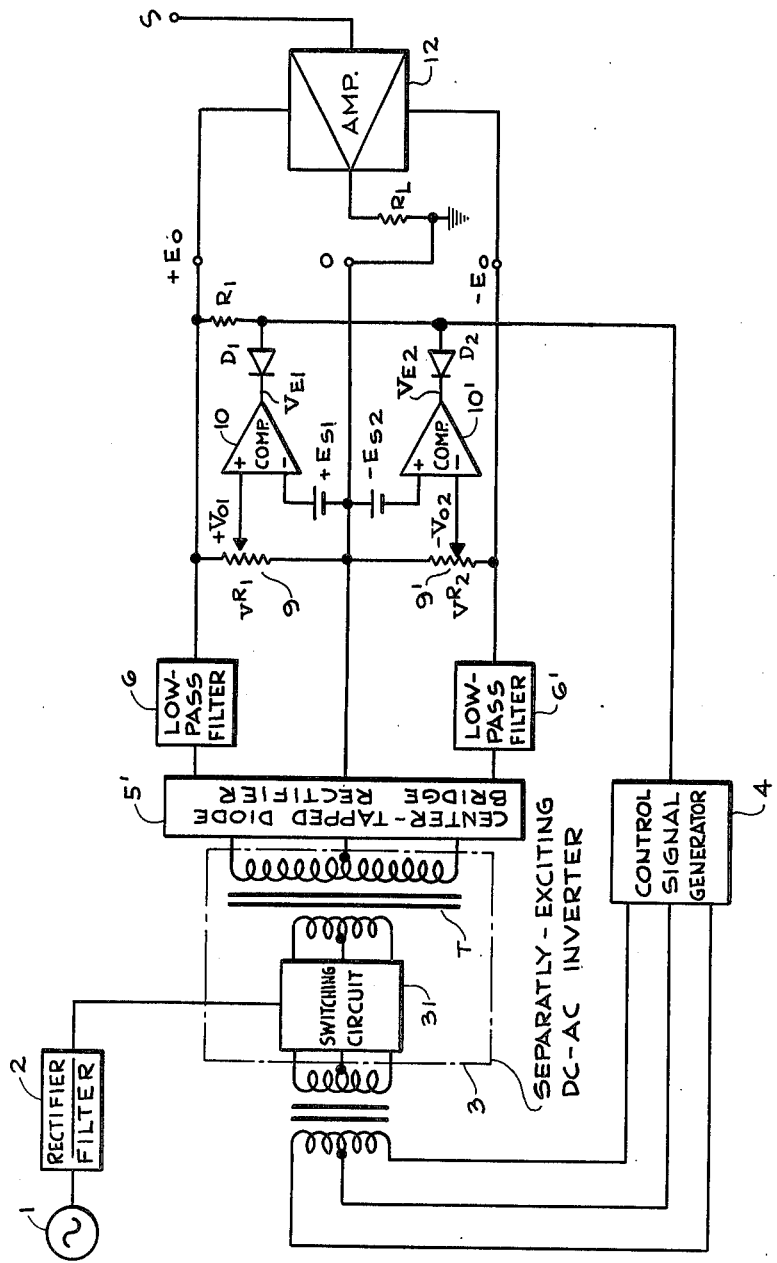
FIG. 5 shows a block diagram of an embodiment of this invention.

Referring to FIG. 5 which shows an embodiment of this invention, the shown DC power supply device provides positive and negative DC powers to an audio-signal power amplifier of a complementary output type 12. The voltages of the both DC outputs are determined equal in an absolute value.

The AC power source 1, the rectifier and filter circuit 2, separately-exciting DC-AC inverter 3, the control signal generator 4, the center-tapped diode bridge rectifier 5', and the low-pass filters 6 and 6' are similar as those in FIGS. 1-3 and are referred by same reference numerals.

The voltage levels of the DC power outputs $+E_0$ and $-E_0$ are sensed by voltage dividers 9 and 9', respectively, which are consisted of variable resistors $VR_1$ and $VR_2$, respectively.

The reference voltage sources $+E_{s1}$ and $-E_{s2}$ are provided to be respectively compared with the sensed voltage levels to provide error signals. Each reference voltage source is shown as a battery but may be any one of known reference voltage providing circuits.

To comparing the voltage level sensed at the divider 9 with the reference voltage $+E_{s1}$, a voltage comparator 10 having an inverting input terminal — and a non-inverting input terminal +, for example, an operational amplifier such as a differential amplifier, is provided. The sensed or divided voltage level $(+V_{01})$ is applied to the non-inverting input terminal and the reference voltage $(+E_{s1})$ is applied to the inverting terminal. Therefore the output voltage $(V_{E1})$ of the comparator 10 is given by following equation;

$$V_{E1} = \{+V_{01} - (+E_{s1})\} \times A_{v1} = (V_{01} - E_{s1}) \times A_{v1} \quad (1)$$

, where $A_{v1}$ is an amplification degree of the comparator 10.

Similarly, another comparator 10' is provided to compare the voltage level ($-V_{02}$) sensed or divided at the divider 9' with the other reference voltage ($-E_{s2}$). The sensed voltage level is applied to the inverting input terminal — and the reference voltage is applied to the non-inverting input terminal + of the comparator 10'. Therefore, the output voltage ($V_{E2}$) of the comparator 10' is defined by following equation;

$$V_{E2} = \{-(-V_{02}) + (-E_{s2})\} \times A_{v2} = (V_{02} - E_{s2}) \times A_{v2} \quad (2)$$

, where $A_{v2}$ is an amplification degree of the comparator 10'.

The output voltage $V_{E1}$ of the comparator 10 is equalized to the output voltage $V_{E2}$ of the comparator 10' by selecting the divided voltages $V_{01}$ and $-V_{02}$, reference voltages $E_{s1}$ and $-E_{s2}$, and the amplification degrees $A_{v1}$ and $A_{v2}$.

The outputs of the comparators 10 and 10' are connected to the positive line of the positive DC output through diodes $D_1$ and $D_2$ and a resistor $R_1$.

When the voltage levels of $V_{E1}$ and $V_{E2}$ are determined lower than the voltage level $+E_0$, the voltage level $V_{E1} = V_{E2}$ presents at the common connection point of the anodes of the diodes $D_1$ and $D_2$ assuming that the forward voltage drop down of each diode is negligible, and are applied to the control signal generator 4. Thus the control signal is applied to the inverter 3 so that the voltage levels of the DC outputs $+E_0$ and $-E_0$ are maintained constant, respectively.

Figure 6:
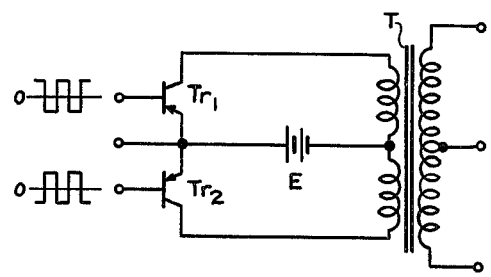
FIG. 6 shows a circuit diagram of an example of a separately-exciting DC-AC inverter used in FIG. 5.

As the separately-exciting DC-AC inverter 3, various known circuits may be employed. A simple circuit inverter using switching transistors is shown in FIG. 6. Referring to FIG. 6, opposite phase pulse trains are applied to transistors $Tr_1$ and $Tr_2$ to be alternatively conducted, so that high frequency square wave outputs may be obtained from the DC power source E on the secondary output of the transformer T. The power of the output can be controlled by the variation of the pulse width, or the pulse repetition frequency, of the pulse trains. The transformer T is usually of one including a core having a square magnetic hysteresis loop.

The audio-signal power amplifier 12 amplifys the signal which is applied to the signal input terminal S and flows the load current to the load $R_L$.

The operation of the device in FIG. 5 will be described referring to FIG. 7 which shows current and voltage waveforms at various points of the device in FIG. 5.

Figure 7:
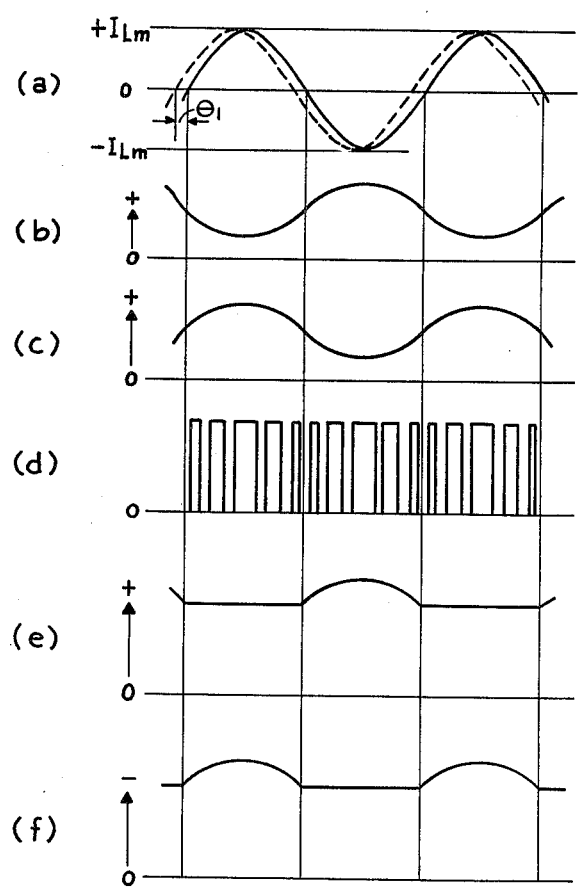
FIG. 7 shows electric current and voltage waveforms at various points of the device in FIG. 5.

When the load current is as shown at (a) in FIG. 7, the DC power is fed from the positive DC output of the DC power supply device to the amplifier 12 during the each positive period of the load current, and, on the other hand, fed from the negative DC output during the each negative period of the load current.

During each positive period of the load current, the positive DC output voltage level drops down due to the existence of the resistance at the secondary winding of the transformer T, the rectifier 5' and the low-pass filter 6. Therefor, the sensed or divided voltage level $+V_{01}$ reduces, and changes correspondingly to the variation of the load current. So that the output voltage level $V_{E1}$ of the comparator 10 also drops down and changes as shown at (b) in FIG. 7. On the other hand, the output voltage level $V_{E2}$ of the other comparator 10' does not drop down because no load current is fed from the negative DC output of the DC power supply device.

Thus, the voltage level of the common connection point between the diodes $D_1$ and $D_2$ and the resistor $R_1$ reduces to the reduced $V_{E1}$, which is, in turn, applied to the control signal generator 4 as an error signal to provide such a control signal to increase the output power of the DC-AC inverter 3. The control signal is shown at (d) in FIG. 7 as a pulse train which is pulse width modulated. Thus, the voltage level of the positive DC power output is maintained constant during period when it is consumed, as shown at (e) in FIG. 7. On the other hand, the voltage level of the negative DC output is elevated in a negative direction during the same period because of the increase of the output power of the DC-AC inverter 3, as shown at (f) in FIG. 7.

During each negative period of the load current, the output voltage level $V_{E2}$ of the comparator 10' drops down as shown at (c) in FIG. 7 and presents at the common connection point between the diodes $D_1$ and $D_2$ and the resistor $R_1$. Thus, the control signal generator 4 similarly provides a control signal to increase the output power of the DC-AC inverter 3. Thus, the voltage level of the negative DC output is maintained constant as shown at (f) in FIG. 7. During the same period, the voltage level of the positive DC output which is not being consumed is elevated as shown at (e) in FIG. 7.

As will be noted from above description, the control signal generator 4 is one that generates such a control signal to increase the inverter output in response to the reduction of the voltage level of the error signal. For example, in case of a control signal generator of a pulse width modulating type, the pulse width of the control signal must be widened in response to the reduction of the voltage level of the error signal.

In the embodiment as shown in FIG. 5, the variation of the voltage level of each DC power output is detected by each comparator. The detected output of a comparator corresponding to a DC power output which is now being consumed, is automatically selected by means of the diodes $D_1$ and $D_2$ and the resistor $R_1$ and applied to the control signal generator 4 as an error signal. Therefore a plurality of DC power outputs which are selectively consumed, can be effectively regulated by the use of only one power control means.

Although the embodiment has been shown as to the device having two DC power outputs, it will be easily understood that a device having three or more DC power outputs is also made similarly.

In the embodiment of FIG. 5, when the time constant of each low-pass filter is large in relation to the frequency of the load current, there is a larger phase differential $\theta_1$ between the load current and the each DC output voltage. The load current in this case is shown by a dotted line at (a) in FIG. 7. But, the affection of the phase differential $\theta_1$ to each DC output voltage can be ignored because the elevation of the voltage level of a DC power output which is not feeding a load current is little due to the relation between the time constant of the low-pass filter and the frequency of the load current.

In FIG. 5, if two input signals to each comparator is coupled with the two input terminals in reverse relation to the arrangement in FIG. 5 and if two diodes $D_1$ and $D_2$ being connected reversely in relation to FIG. 5 with the resistor $R_1$ being omitted, the error signal of a DC output which is now being consumed is taken out as a highest level voltage of output voltages from the comparators 10 and 10'. Therefore, if the control signal generator 4 is one that generates such a control signal to increase the inverter output in response to the increase of the voltage level of the error signal, the voltage of the one of DC outputs which is now being consumed can be maintained constant by the use of only one power control means, similarly as in FIG. 5.

Figure 8:
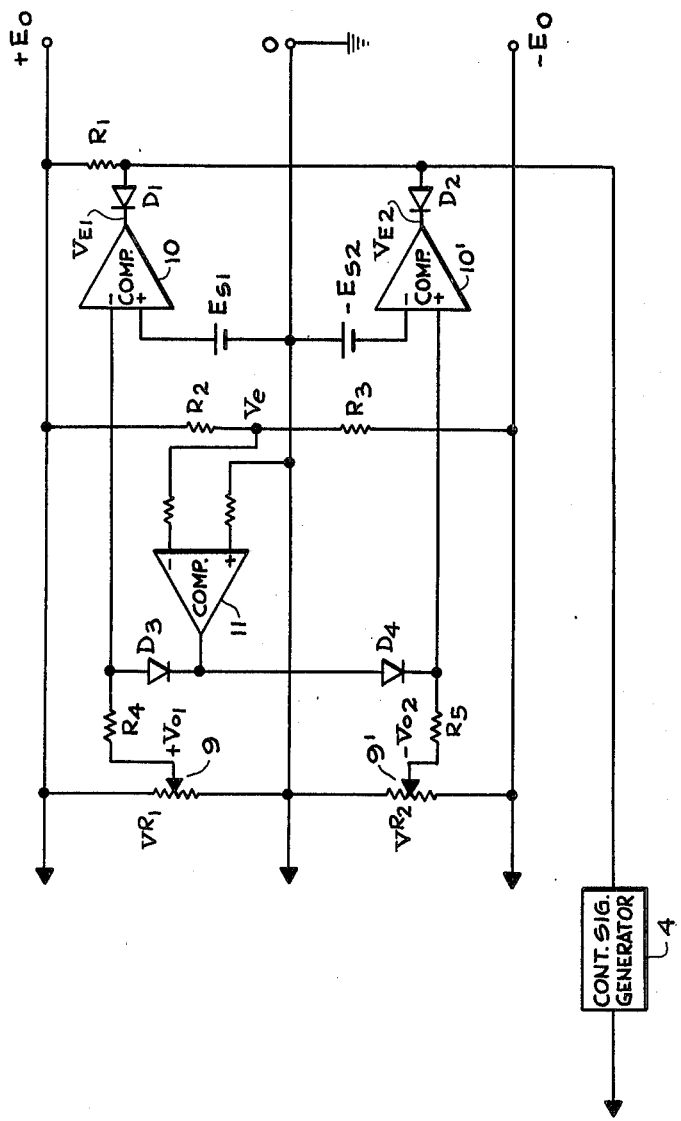
FIG. 8 shows a modification of the embodiment in FIG. 5, only modified portion being drawn.

FIG. 8 shows a modification of the embodiment in FIG. 5. For the simplification, only a modified portion is drawn. Referring to FIG. 8, the voltage level $+V_{01}$ divided by the divider 9 is applied to the inverting input terminal — of the comparator 10. Therefore, the reference voltage $+E_{s1}$ is applied to the non-inverting input terminal + of the comparator 10. On the other hand, the voltage level $-V_{02}$ divided by the divider 9' is applied to the non-inverting input terminal + of the comparator 10' and the reference voltage $-E_{s2}$ is applied to the inverting input terminal of the comparator 10'.

Therefore, the output voltage levels $V_{E1}$ and $V_{E2}$ of the comparators 10 and 10', are given by following equations;

$$V_{E1} = \{(+E_{s1}) - (+V_{o1})\} \times A_{v1} \quad V_{E2} = \{-(-E_{s2}) + (-V_{02})\} \times A_{v2}$$

, where $A_{v1}$ and $A_{v2}$ are amplification degrees of the comparators 10 and 10', respectively.

$V_{E1}$ and $V_{E2}$ are equalized by selecting $E_{s1}$, $E_{s2}$, $V_{01}$ and $V_{02}$, if $A_{v1} = A_{v2}$.

A voltage divider consisting of resistors $R_2$ and $R_3$ is provided between the positive line and the negative line to take out zero voltage level. The divided voltage level $V_e$ is applied to an inverting input terminal of a comparator 11, a non-inverting input terminal of which is grounded $V_d$.

The output of the comparator 11 is coupled to a common connection point between diodes $D_3$ and $D_4$ which are connected between both dividing points of the dividers 9 and 9' in series with one another.

The additional comparator 11 amplifys the differential between two input voltage levels to provide an output voltage of a higher level than the voltage level $+V_{o1}$ or of a lower level than the voltage level $-V_{o2}$, dependently of the potential of the divided voltage level $V_e$. Therefore, the comparator 11 operates like a switch element to switch between a higher level voltage and a lower level voltage.

Now, when the positive DC power output feeds a load current, the positive output voltage $+E_O$ drops down. As a result, the voltage $V_e$ divided by the divider $R_2-R_3$ is negative, so that the output voltage of the comparator 11 is higher than the voltage level $+V_{o1}$ divided by the divider. Accordingly the voltage $+V_{o1}$ is applied to the inverting input terminal of the comparator 10 so that the output voltage $V_{E1}$ of the comparator 10 is positive. At the same time, the high positive output voltage of the comparator 11 is applied to the non-inverting input terminal of the other comparator 10' so that the output voltage $V_{E2}$ of the comparator 10' is positive and higher than the output voltage $V_{E1}$ of the comparator 10.

Therefore, the output voltage $V_{E1}$ of the comparator 10 presents at a common connection point between the diodes $D_1$ and $D_2$ and the resistor $R_1$ and is applied to the control signal generator (4 in FIG. 5) as an error signal.

In this modification, the control signal generator 4 is one that generates such a control signal to increase the inverter output in response to the increase of the voltage level of the error signal. For example, in case of a control signal generator of a pulse width modulating type, the pulse width of the control signal must be widened in response to the increase of the voltage level of the error signal.

When the load current is fed from the negative DC power output, the voltage level of the negative DC power output reduces in the negative side. As a result, the voltage level $V_e$ divided by the divider $R_2-R_3$ is positive so that the output voltage of the comparator 11 becomes larger than the voltage $-V_{02}$ of the divider 9' in the negative side. Accordingly, the output voltage $V_{E2}$ of the comparator 10' reduces, and the output voltage $V_{E1}$ of the comparator 10 is elevated to a higher value. So that $V_{E2}$ becomes lower than $V_{E1}$.

Therefore, the output voltage $V_{E2}$ of the comparator 10' is applied to the control signal generator 4 as an error signal.

Thus, the modified embodiment can also detect the variation of the voltage of one of two DC power outputs which is now being consumed and apply it to the control signal generator as an error signal. Therefore, the positive and negative DC power outputs which are selectively consumed, are stabilized by the use of only one power control means.

In FIG. 8, if two input signals to each of comparators 10 and 10' is coupled with the two input terminals in reverse relation to the arrangement in FIG. 8 and if two diodes $D_1$ and $D_2$ being connected reversely in relation to FIG. 8 with the resistor $R_1$ being omitted, the error signal of a DC output which is now being consumed is taken out as a highest level voltage of output voltages from the comparators 10 and 10'. Therefore, if the control signal generator 4 is one that generates such a control signal to increase the inverter output in response to the reduction of the voltage level of the error signal, the voltage of the one of DC outputs which is now being consumed can be maintained constant by the use of only one power control means, similarly as in FIG. 8.

Figure 9:
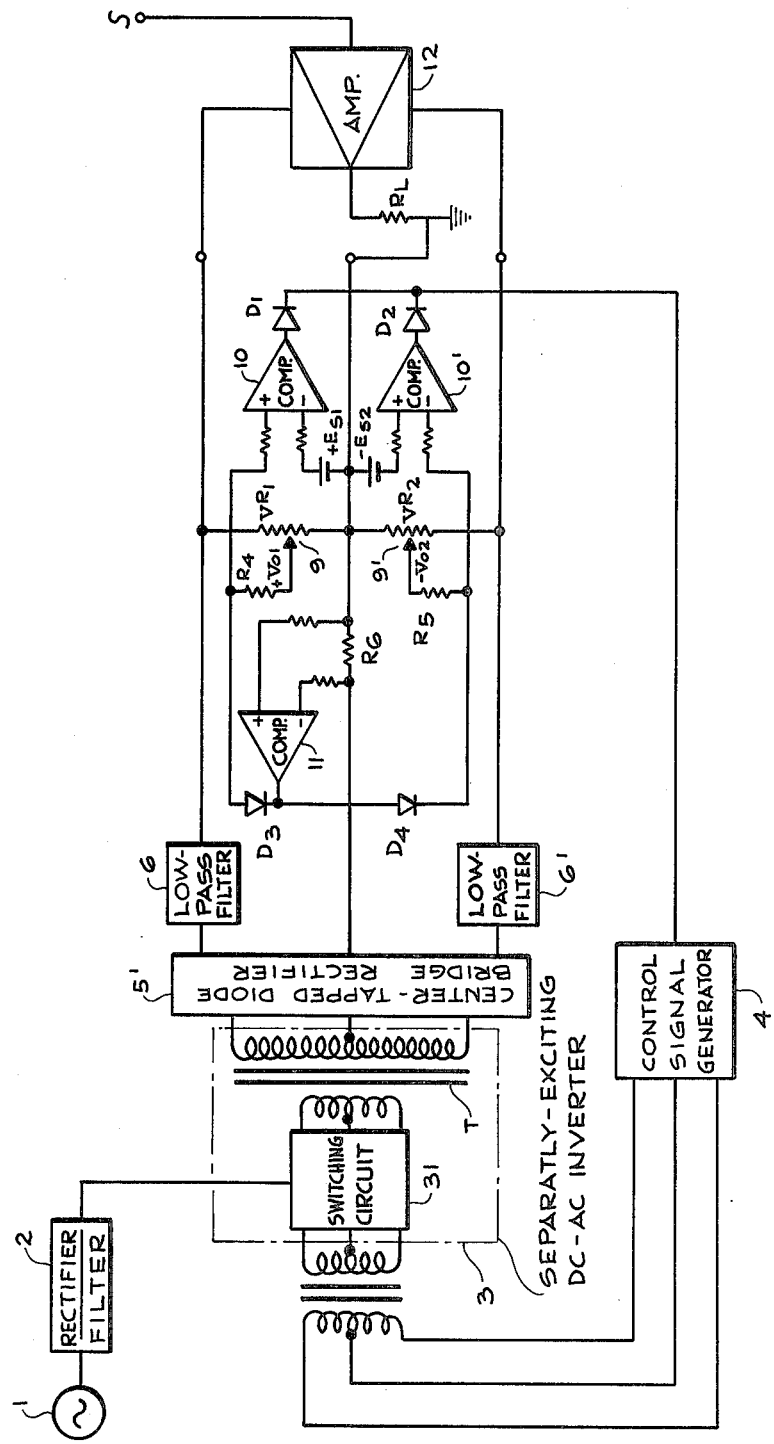
FIG. 9 shows a block diagram of another embodiment of this invention.

FIG. 9 shows another embodiment of this invention which is similar as the embodiment in FIG. 5 except means for detecting the voltage variation of one of the DC power outputs which is now being consumed and for applying it the control signal generator as an error signal. Similar parts are referred by same reference characters as in FIG. 5.

Referring to FIG. 9, a resistor $R_6$ is inserted in the zero voltage line of the DC outputs, the value of which is selected far smaller than the load $R_L$. The voltage across the resistor $R_6$ is applied to the input of a comparator 11 in such manner that the grounded side is connected to a non-inverting input terminal +, the opposite side being connected to an inverting input terminal —.

The circuits for detecting the voltage variations in respective DC power outputs, or divider 9 — comparator 10 — reference voltage $+E_{s1}$ and divider 9' — comparator 10' — reference voltage $-E_{s2}$, are similar as in FIG. 5.

The output of the comparator 11 is coupled to a common connection point between diodes $D_3$ and $D_4$ which are provided in series with one another between both dividing points of the dividers 9 and 9', similarly as in FIG. 8.

The additional comparator 11 amplifys the differential between two input voltage levels to provide an output voltage of a higher level than the voltage level $+V_{o1}$ or of a lower level than the voltage level $-V_{o2}$, dependently to the potential of the divided voltage level $V_e$. Therefore, the comparator 11 operates like a switch element to switch between a higher level voltage and a lower level voltage.

Both outputs of the comparators 10 and 10' are commonly connected through diodes $D_1$ and $D_2$, and the commonly connected cathodes of the diodes are coupled with the control signal generator 4.

The control signal generator 4 generates a pulse train with a wided pulse width in response to the reduction of the positive voltage signal from the diode.

Figure 10:
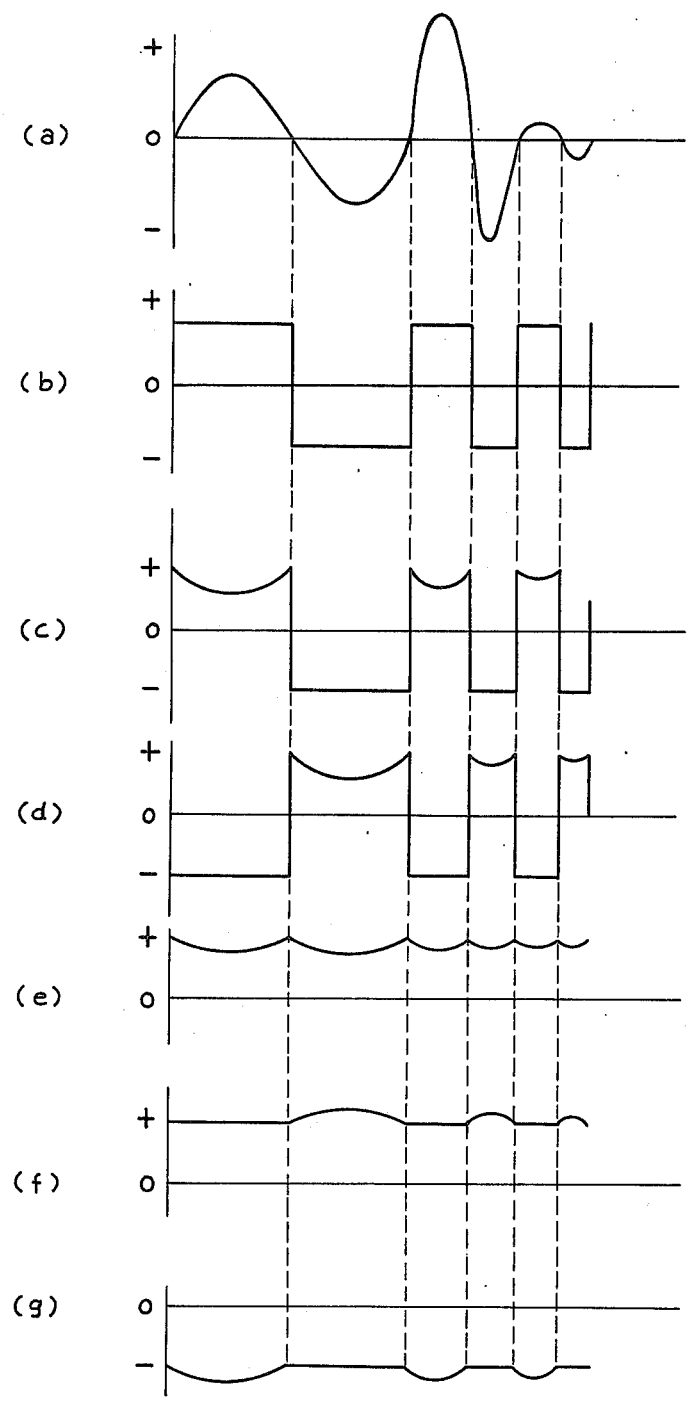
FIG. 10 shows electric current and voltage waveforms at various points in the device in FIG. 9.

When the amplifier 12 operates to amplify the input signal from the input terminal S so that a load current flows through the load $R_L$ as shown at (a) in FIG. 10, the output voltage of the comparator 11 is positive during each positive period of the load current and is negative during each negative period of the load current. Therefore, during the positive period of the load current, the output voltage of the comparator 10 is positive and the output voltage of the other comparator 10' is negative, as shown at (c) and (d), respectively, in FIG. 10. On the other hand, during the negative period of the load current, the output voltage of the comparator 10' is positive and the voltage of the comparator 10 is negative as shown at (d) and (c), respectively, in FIG. 10.

Since anodes of diodes $D_1$ $D_2$ are connected to the outputs of the comparators 10 and 10', the positive voltage signal is taken out and is fed to the control signal generator 4 as an error signal as shown at (e) in FIG. 10.

Therefore the voltage of one of DC outputs which is being now consumed is regulated and the voltage level of the other DC output which is not consumed is elevated in absolute value, as shown at (f) and (g) in FIG. 10.

In FIG. 9, if two input signals to each comparator is coupled with the two input terminals in reverse relation to the arrangement in FIG. 9 and if two diodes $D_1$ and $D_2$ being connected reversely in relation to FIG. 9 with the resistor $R_1$ being connected, the error signal of a DC output which is now being consumed is taken out as a lowest level voltage of output voltages from the comparators 10 and 10'. Therefore, if the control signal generator 4 is one that generates such a control signal to increase the inverter output in response to the increase of the voltage level of the error signal, the voltage of the one of DC outputs which is now being consumed can be maintained constant by the use of only one power control means, similarly as in FIG. 9.

This invention has been described in conjunction with specific embodiments, but it will be easily understood by those skilled in the art to be able to easily make various modifications and other designations within the scope of the invention.

What is claimed is:

1. A stabilized DC power supply device for providing a plurality of DC power outputs which are selectively consumed, comprising:
 a DC power source;
 a single power control means coupled to said DC power source and providing high frequency AC outputs with controlled powers from said DC power source, said power control means comprising a DC-AC inverter circuit and means for receiving a control signal and controlling powers of the AC outputs from said DC-AC inverter circuit, said DC-AC inverter circuit including an inverter transformer having a plurality of secondary windings, from each of which a high frequency AC output with a predetermined voltage is taken out;
 a plurality of rectifier circuit means coupled to said plurality of secondary windings to respectively rectify said high frequency AC outputs present on said secondary windings;
 a plurality of low pass filter circuit means coupled to said plurality of rectifier circuit means to remove ripples from outputs of said rectifier circuit means and to provide said plurality of DC outputs with predetermined voltages to output lines, respectively;
 a plurality of reference voltage sources, each reference voltage of which is predetermined in relation to said predetermined voltage of each corresponding one of said plurality of DC outputs;
 a plurlaity of voltage sensing means for sensing voltages of said plurality of DC outputs respectively;
 a plurality of voltage comparator means, each of which compares the reference voltage of each one of said reference voltage sources with the sensed voltage by a corresponding one of said voltage sensing means to provide an error signal, output voltages of said voltage comparator means being equal to one another when said plurality of DC outputs are maintained at said predetermined voltages;
 means for detecting a DC output which is being consumed by comparing output voltages of said voltage comparator means to one another and for applying the error signal from one of said voltage comparator means corresponding to said detected DC output to a control signal generator means;
 and said control signal generator means for providing said control signal from said applied error signal to control powers of said AC outputs from said power control means so that the voltage of said detected DC output is regulated to its predetermined voltage.

2. The stabilized DC power supply device as claimed in claim 1, wherein each of said plurality of voltage comparator means comprises an operational amplifier having two input terminals to which two voltage signals to be compared are applied respectively, each of said reference voltages being so determined in relation to the predetermined voltage of each corresponding one of said DC power outputs that output voltages of all of said operational amplifiers are equal at the time when none of said DC power outputs is consumed.

3. The stabilized DC power supply device as claimed in claim 2, wherein said means for detecting a DC output which is being consumed comprises a plurality of diode means which are provided at outputs of said operational amplifiers respectively, said plurality of diode means being commonly connected to said control signal generator at similar electrodes of said diode means.

4. The stabilized DC power supply device as claimed in claim 3, wherein said diode means being commonly connected to a positive line of one of said DC outputs at anodes of said diode means through a resistor, and said common connection being coupled with said control signal generator.

5. The stabilized DC power supply device as claimed in claim 4, wherein each control signal generator means comprises a pulse generator and a pulse width modulator which widens the pulse width of the pulse train from said pulse generator in response to the reduction of the voltage level of said error signal to provide the modulated pulse train as said control signal.

6. The stabilized DC power supply device as claimed in claim 5, wherein the number of said DC power outputs are two, voltages of said two DC power outputs being positive and negative, respectively, and having a predetermined value in the absolute value.

7. The stabilized DC power supply device as claimed in claim 1, wherein the number of the DC power outputs is two, said two outputs having positive and negative voltages respectively and commonly using a zero potential line.

8. A stabilized DC power supply device for providing two DC power outputs which are selectively consumed, comprising:

a DC power source;
a single power control means coupled to said DC power source and providing high frequency AC outputs with controlled powers from said DC power source, said power control means comprising a DC-AC inverter circuit and means for receiving a control signal and controlling powers of the AC outputs from said DC-AC inverter circuit, said DC-AC inverter circuit including an inverter transformer having a plurality of secondary windings, from each of which a high frequency AC output with a predetermined voltage is taken out;
a plurality of rectifier circuit means coupled to said plurality of secondary windings to respectively rectify said high frequency AC outputs present on said secondary windings;
a plurality of low pass filter circuit means coupled to said plurality of rectifier circuit means to remove ripples from outputs of said rectifier circuit means and to provide said DC outputs with predetermined positive and negative voltages respectively and commonly using a zero potential line;
a plurality of reference voltage sources, each reference voltage of which is predetermined in relation to said predetermined voltage of each corresponding one of said DC outputs;
a plurality of voltage sensing means for sensing voltages of said DC outputs respectively;
a plurality of voltage comparator means, each of which compares the reference voltage of each one of said reference voltage sources with the sensed voltage by a corresponding one of said voltage sensing means to provide an error signal;
means for detecting a DC output which is being consumed and for applying the error signal from one of said voltage comparator means corresponding to said detected DC output to a control signal generator means;
with said control signal generator means providing said control signal from said applied error signal to control powers of said AC outputs from said power control means so that the voltage of said detected DC output is regulated to its predetermined voltage; and
with said means for detecting a DC output which is being consumed comprising first means for providing either one of positive or negative voltage depending on which of said two DC outputs is being consumed,
second means for providing either one of a high positive or negative voltage in response to the output voltage of said first means,
third means for permitting only one of said sensed voltages to be inputted to a corresponding one of said voltage comparator means in response to the output of said second means, and
fourth means for detecting the output from said corresponding one of said voltage comparator means to apply the detected output as an error signal to said control signal generator means.

9. The stabilized DC power supply device as claimed in claim 8, wherein said first means comprises a means for providing a negative voltage at a time when said positive DC output is being consumed and a positive voltage at another time when said negative DC output is being consumed, and wherein said second means comprises a means for providing a positive high voltage in response to the negative voltage from said first means and a negative high voltage in response to the positive voltage from said first means.

10. The stabilized DC power supply device as claimed in claim 9, wherein said second means comprises an additional voltage comparator means which has an inverting input terminal to be connected with the output of said first means and has a non-inverting input terminal to be grounded.

11. The stabilized DC power supply device as claimed in claim 10, wherein said third means comprises two diode means which are connected in series between the outputs of said voltage sensing means, the common connection point being coupled with the output of said additional voltage comparator means, whereby the sensed output voltage on a DC output which is being consumed is applied to a corresponding one of said voltage comparator means, with the output of said additional comparator means being coupled with the other one of said voltage comparator means.

12. The stabilized DC power supply device as claimed in claim 11, wherein one of said voltage comparator means has an inverting input terminal which is coupled to a sensed voltage of a voltage sensing means corresponding to the positive DC output and a non-inverting input terminal which is coupled to a reference voltage source corresponding to the positive DC output, the other of said voltage comparator means having an inverting input terminal which is coupled to a reference voltage source corresponding to the negative DC output and a non-inverting input terminal which is coupled to a sensed voltage of a voltage sensing means corresponding to the negative DC output, and said fourth means comprising diode means which are coupled to the outputs of said voltage comparator means, respectively, at the cathodes thereof and a resistor commonly coupling the anodes of said diode means with the positive line of the positive DC output, said anodes being commonly connected to said control signal generator means.

13. The stabilized DC power supply device as claimed in claim 12, wherein said first means comprises a voltage divider which is connected across a positive output line and a negative output line of said two DC power outputs to take out a zero potential by the voltage division thereof.

14. The stabilized DC power supply device as claimed in claim 11, wherein one of said voltage comparator means has a non-inverting terminal which is coupled to a sensed voltage of a voltage sensing means corresponding to the positive DC output and an inverting input terminal which is coupled to a reference voltage source corresponding to the positive DC power output, the other of said voltage comparator means having an non-inverting input terminal which is coupled to a reference voltage source corresponding to the negative DC output and an inverting input terminal which is coupled to a sensed voltage of a voltage sensing means corresponding to the negative DC output, and said fourth means comprising diode means which are coupled to the outputs of said voltage comparator means, respectively, at the anodes, the cathodes of said diode means being commonly connected to said control signal generator means.

15. The stabilized DC power supply device as claimed in claim 14, wherein said first means comprises a resistor which is inserted in said common zero potential line, the opposite side to the grounded side of said resistor being connected to said inverting input terminal of said additional voltage comparator means.

* * * * *